US008478515B1

(12) United States Patent
Foucher et al.

(10) Patent No.: US 8,478,515 B1
(45) Date of Patent: Jul. 2, 2013

(54) COLLABORATIVE DRIVING DIRECTIONS

(75) Inventors: Trevor Foucher, Seattle, WA (US); Andrew R. Golding, Mountain View, CA (US)

(73) Assignee: Google Inc., Mountain View, CA (US)

( * ) Notice: Subject to any disclaimer, the term of this patent is extended or adjusted under 35 U.S.C. 154(b) by 443 days.

(21) Appl. No.: 11/752,896

(22) Filed: May 23, 2007

(51) Int. Cl.
G01C 21/00 (2006.01)
(52) U.S. Cl.
USPC .............................. 701/400; 701/1; 701/435
(58) Field of Classification Search
USPC .................. 701/200, 201, 202, 206, 208, 209
See application file for complete search history.

(56) References Cited

U.S. PATENT DOCUMENTS

| | | | |
|---|---|---|---|
| 4,972,319 A | 11/1990 | Delorme | |
| 5,051,928 A | 9/1991 | Gruters | |
| 5,559,707 A | 9/1996 | DeLorme et al. | |
| 5,613,051 A | 3/1997 | Iodice et al. | |
| 5,625,668 A * | 4/1997 | Loomis et al. | 455/456.5 |
| 5,646,751 A | 7/1997 | Motamed et al. | |
| 5,737,533 A | 4/1998 | de Hond | |
| 5,760,783 A | 6/1998 | Migdal et al. | |
| 5,802,492 A | 9/1998 | DeLorme et al. | |
| 5,842,009 A * | 11/1998 | Borovoy et al. | 1/1 |
| 5,848,373 A | 12/1998 | DeLorme et al. | |
| 5,910,805 A | 6/1999 | Hickey et al. | |
| 5,938,709 A | 8/1999 | Hale et al. | |
| 6,002,809 A | 12/1999 | Feig et al. | |
| 6,031,963 A | 2/2000 | Kitamura et al. | |
| 6,054,990 A | 4/2000 | Tran | |
| 6,098,015 A | 8/2000 | Nimura et al. | |
| 6,100,897 A | 8/2000 | Mayer et al. | |
| 6,111,583 A | 8/2000 | Yaron et al. | |
| 6,144,338 A | 11/2000 | Davies | |
| 6,167,382 A | 12/2000 | Sparks et al. | |
| 6,182,010 B1 | 1/2001 | Berstis | |
| 6,199,014 B1 * | 3/2001 | Walker et al. | 701/211 |
| 6,202,026 B1 | 3/2001 | Nimura et al. | |
| 6,208,934 B1 | 3/2001 | Bechtolsheim et al. | |
| 6,247,019 B1 | 6/2001 | Davies | |

(Continued)

FOREIGN PATENT DOCUMENTS

| | | |
|---|---|---|
| CA | 2169421 | 11/1996 |
| EP | 0967556 A2 | 12/1999 |
| EP | 1193626 | 4/2002 |
| WO | WO 00/39755 | 7/2000 |

OTHER PUBLICATIONS

Maneesh Agrawala and Chris Stolte, "A Design and Implementation for Effective Computer-Generated Route Maps", Article, Mar. 2000, Computer Science Department, Stanford University.

(Continued)

*Primary Examiner* — Khoi Tran
*Assistant Examiner* — Bhavesh V Amin
(74) *Attorney, Agent, or Firm* — McDermott Will & Emery LLP

(57) ABSTRACT

Methods and systems for generating directions are disclosed. In an embodiment of the invention, there is a system that includes a human-provided directions module for receiving and processing human-provided directions, a database for storing human-provided directions processed by the human-provided directions module, and a directions generator for receiving a directions query from a client. In response to the query, the directions generator accesses the database, retrieves at least one human-provided direction, generates a set of directions based thereupon, and provides the set of generated directions to the client.

56 Claims, 5 Drawing Sheets

U.S. PATENT DOCUMENTS

| | | | |
|---|---|---|---|
| 6,252,608 B1 | 6/2001 | Snyder et al. | |
| 6,262,741 B1 | 7/2001 | Davies | |
| 6,266,614 B1 | 7/2001 | Alumbaugh | |
| 6,278,938 B1 | 8/2001 | Alumbaugh | |
| 6,307,573 B1 | 10/2001 | Barros | |
| 6,321,158 B1 | 11/2001 | DeLorme et al. | |
| 6,346,938 B1 | 2/2002 | Chan et al. | |
| 6,388,684 B1 | 5/2002 | Iwamura et al. | |
| 6,421,053 B1 | 7/2002 | Johns et al. | |
| 6,430,553 B1* | 8/2002 | Ferret | 707/3 |
| 6,473,691 B1 | 10/2002 | Winter et al. | |
| 6,496,189 B1 | 12/2002 | Yaron et al. | |
| 6,523,061 B1* | 2/2003 | Halverson et al. | 709/202 |
| 6,532,418 B2* | 3/2003 | Chun et al. | 701/209 |
| 6,538,656 B1 | 3/2003 | Cheung et al. | |
| 6,573,905 B1 | 6/2003 | MacInnis et al. | |
| 6,584,401 B2* | 6/2003 | Kirshenbaum et al. | 701/202 |
| 6,622,084 B2* | 9/2003 | Cardno et al. | 701/202 |
| 6,718,258 B1* | 4/2004 | Barton | 701/200 |
| 6,724,382 B2 | 4/2004 | Kenyon et al. | |
| 6,741,926 B1* | 5/2004 | Zhao et al. | 701/201 |
| 6,766,320 B1* | 7/2004 | Wang et al. | 707/5 |
| 6,826,472 B1 | 11/2004 | Kamei et al. | |
| 6,853,905 B2* | 2/2005 | Barton | 701/200 |
| 6,944,533 B2* | 9/2005 | Kozak et al. | 701/200 |
| 7,050,068 B1 | 5/2006 | Bastos et al. | |
| 7,054,741 B2 | 5/2006 | Harrison et al. | |
| 7,054,745 B1* | 5/2006 | Couckuyt et al. | 701/211 |
| 7,081,902 B1 | 7/2006 | Crow et al. | |
| 7,136,915 B2 | 11/2006 | Rieger, III | |
| 7,210,119 B2 | 4/2007 | Pothos et al. | |
| 7,222,306 B2 | 5/2007 | Kaasila et al. | |
| 7,260,474 B1 | 8/2007 | Thayathil et al. | |
| 7,353,034 B2 | 4/2008 | Haney | |
| 7,373,244 B2 | 5/2008 | Kreft | |
| 7,451,041 B2 | 11/2008 | Laumeyer et al. | |
| 7,542,882 B2 | 6/2009 | Agrawala et al. | |
| 7,565,240 B2 | 7/2009 | Tomizawa | |
| 7,580,045 B2 | 8/2009 | Harrison et al. | |
| 7,610,219 B2 | 10/2009 | Sayed | |
| 7,617,296 B2 | 11/2009 | Bank | |
| 2001/0034661 A1 | 10/2001 | Ferreira | |
| 2001/0044837 A1 | 11/2001 | Talib et al. | |
| 2002/0002478 A1 | 1/2002 | Swart et al. | |
| 2002/0067353 A1 | 6/2002 | Kenyon et al. | |
| 2002/0067374 A1 | 6/2002 | Kenyon | |
| 2002/0067379 A1 | 6/2002 | Kenyon et al. | |
| 2002/0095328 A1 | 7/2002 | Swart et al. | |
| 2002/0099613 A1 | 7/2002 | Swart et al. | |
| 2002/0159657 A1 | 10/2002 | DeLorme | |
| 2002/0163654 A1 | 11/2002 | Levantovsky | |
| 2003/0038845 A1 | 2/2003 | Okamura | |
| 2003/0041087 A1 | 2/2003 | Pothos et al. | |
| 2003/0050065 A1 | 3/2003 | Alletson et al. | |
| 2003/0061211 A1 | 3/2003 | Shultz et al. | |
| 2003/0078897 A1 | 4/2003 | Florance et al. | |
| 2003/0095135 A1 | 5/2003 | Kaasila et al. | |
| 2003/0182052 A1 | 9/2003 | DeLorme et al. | |
| 2003/0220734 A1 | 11/2003 | Harrison et al. | |
| 2004/0039520 A1* | 2/2004 | Khavakh et al. | 701/201 |
| 2004/0075660 A1 | 4/2004 | Liao et al. | |
| 2004/0100460 A1* | 5/2004 | Yamada et al. | 345/204 |
| 2004/0128215 A1 | 7/2004 | Florance et al. | |
| 2004/0145599 A1 | 7/2004 | Taoka et al. | |
| 2004/0153434 A1 | 8/2004 | Cogen et al. | |
| 2005/0065856 A1 | 3/2005 | Roberts et al. | |
| 2005/0122294 A1 | 6/2005 | Ben-David et al. | |
| 2005/0131634 A1 | 6/2005 | Ignatin | |
| 2005/0171686 A1 | 8/2005 | Davis | |
| 2005/0216287 A1 | 9/2005 | Crosby et al. | |
| 2005/0216448 A1 | 9/2005 | Talib et al. | |
| 2005/0246487 A1 | 11/2005 | Ergan et al. | |
| 2005/0246627 A1 | 11/2005 | Sayed | |
| 2005/0270299 A1 | 12/2005 | Rasmussen et al. | |
| 2005/0270311 A1 | 12/2005 | Rasmussen et al. | |
| 2005/0286493 A1 | 12/2005 | Angelhag | |
| 2006/0017562 A1 | 1/2006 | Bachelder | |
| 2006/0041375 A1 | 2/2006 | Witmer et al. | |
| 2006/0075442 A1 | 4/2006 | Meadow | |
| 2006/0089792 A1* | 4/2006 | Manber et al. | 701/207 |
| 2006/0123053 A1 | 6/2006 | Scannell | |
| 2006/0173841 A1 | 8/2006 | Bill | |
| 2006/0200383 A1 | 9/2006 | Arutunian et al. | |
| 2006/0206363 A1* | 9/2006 | Gove | 705/6 |
| 2006/0241859 A1 | 10/2006 | Kimchi et al. | |
| 2006/0271286 A1 | 11/2006 | Rosenberg | |
| 2007/0010942 A1 | 1/2007 | Bill | |
| 2007/0011145 A1 | 1/2007 | Snyder | |
| 2007/0022007 A1 | 1/2007 | Lawe | |
| 2007/0050340 A1 | 3/2007 | Von Kaenel et al. | |
| 2007/0073583 A1 | 3/2007 | Grouf et al. | |
| 2007/0073584 A1 | 3/2007 | Grouf et al. | |
| 2007/0100801 A1 | 5/2007 | Celik et al. | |
| 2007/0100802 A1 | 5/2007 | Celik | |
| 2007/0100867 A1 | 5/2007 | Celik et al. | |
| 2007/0106468 A1 | 5/2007 | Eichenbaum et al. | |
| 2007/0154067 A1 | 7/2007 | Laumeyer et al. | |
| 2007/0156524 A1 | 7/2007 | Grouf et al. | |
| 2007/0156525 A1 | 7/2007 | Grouf et al. | |
| 2007/0179867 A1 | 8/2007 | Glazer et al. | |
| 2007/0192189 A1 | 8/2007 | Popowich et al. | |
| 2007/0198182 A1 | 8/2007 | Singh | |
| 2007/0203643 A1 | 8/2007 | Ramaswamy et al. | |
| 2007/0239348 A1 | 10/2007 | Cheung | |
| 2007/0244753 A1 | 10/2007 | Grouf et al. | |
| 2007/0265858 A1 | 11/2007 | Pansari et al. | |
| 2008/0027642 A1 | 1/2008 | Winberry et al. | |
| 2008/0040212 A1 | 2/2008 | Grouf et al. | |
| 2008/0052150 A1 | 2/2008 | Grouf et al. | |
| 2008/0052151 A1 | 2/2008 | Xie et al. | |
| 2010/0185514 A1 | 7/2010 | Glazer et al. | |

OTHER PUBLICATIONS

Supplementary European Search Report for European Patent Application No. EP05713028, Sep. 6, 2010, 3 Pages.

Communication pursuant to Article 94(3) EPC, for European Patent Application No. EP05729642.8, Oct. 8, 2010, 6 Pages.

Supplementary European Search Report, European Patent Application No. EP 05729642, May 12, 2010, 5 Pages.

Supplementary European Search Report, European Patent Application No. 05726046, Nov. 6, 2008, 3 pages.

Canadian Office Action, Canadian Patent Application No. 2,560,560, Mar. 18, 2009, 2 pages.

Canadian Office Action, Canadian Patent Application No. 2,560,558, Aug. 7, 2009, 3 pages.

First Office Action of China State Intellectual Property Office, Chinese Patent Application No. 200580013512.0, May 8, 2009, 10 pages.

First Office Action of China State Intellectual Property Office, Chinese Patent Application No. 200580013912.1, Aug. 28, 2009, 16 pages.

Second Office Action of China State Intellectual Property Office, Chinese Patent Application No. 200580013512.0, Oct. 23, 2009, 8 Pages.

United States Office Action, U.S. Appl. No. 11/088,542, Dec. 3, 2008, 5 pages.

United States Office Action, U.S. Appl. No. 11/323,603, Jul. 29, 2009, 5 pages.

Canadian Office Action, Canadian Patent Application No. 2,560,560, Feb. 5, 2008, 3 pages.

Canadian Office Action, Canadian Patent Application No. 2,560,386, Oct. 29, 2007, 3 pages.

Indian Office Action, Indian Patent Application No. 1237/MUMNP/2006, Nov. 13, 2007, 2 pages.

Indian Office Action, Indian Patent Application No. 1247/MUMNP/2006, Nov. 8, 2007, 2 pages.

PCT International Search Report and Written Opinion, PCT/US06/26745, Nov. 21, 2007, 7 pages.

PCT International Search Report and Written Opinion, PCT/US05/09538, Sep. 20, 2007, 7 pages.

"Paid Search" Webopedia, 2010, 1 page, can be retrieved online at <URL:www.webopedia.com/TERM/P/paid_search.html>.

Brenner, C., et al., "Extracting Landmarks for Car Navigation Systems Using Existing GIS Databases and Laser Scanning," ISPRS Archives, Sep. 2003, 6 pages, vol. XXXIV, Part 3/W8.

Burnett, G.E., ""Turn right at the King's Head" Drivers' requirements for route guidance information," A Doctoral Thesis of Loughborough University, Nov. 1998, [online] [retrieved on Feb. 22, 2010], Retrieved from the internet <URL: http://dspace.mitedu/handle/1721.1/14225>.

Burnett, G.E., "Turn right at the traffic lights" The requirement for landmarks in vehicle navigation systems, The Journal of Navigation, 2000, p. 499-5010, vol. 53 No. 3.

Davis, J.R., "The Back Seat Driver: Real Time Spoken Driving Instructions," IEEE, 1989, pp. 146-150.

Cosman, M., "Global Terrain Texture: Lowering the Cost," Proceedings of the 1994 Image VII Conference, Tempe, Arizona: The Image Society, pp. 53-64.

Crawford, C., et al., Fast 3D Visualization of Large Image Datasets in a GIS, Earth Observation Magazine, vol. 12, No. 9, Dec. 2003, USA, pp. 1-5.

Dragan, R. V., MSN Virtual Earth 1.0, MSN Virtual Earth 1.0 review by PC Magazine, Jul. 26, 2005, [online], [retrieved on Aug. 1, 2005]. Retrieved from the Internet <URL: http://www.pcmag.com/article2/0,1895,1840750.00.asp>, pp. 1-2.

ESRI Video Clips—Demos—What is GIS?, ESRI GIS and Mapping Software, Mar. 31, 2006, [online] [Retrieved on Mar. 31, 2006] Retrieved from the InternetURL:http://gis2.esri.com/esriclips/clip.cfm?ClipID=60.

Gleicher, M. et al., "Through-the-Lens Camera Control," Proceedings SIGGRAPH '92, Computer Graphics, Jul. 1992, pp. 331-340, vol. 26, No. 2.

Ho, T. K., et al., "Word Recognition with Multi-Level Contextual Knowledge," Center for Document Analysis and Recognition, State University of New York at Buffalo, pp. 1-11, Buffalo, New York.

Leclerc et al., "TerraVision: A Terrain Visualization System," SRI International, Menlo Park, California, Tech. Note No. 540, Apr. 22, 1994.

MapQuest.Com Maps, Directions and More, [online], [retrieved on Aug. 1, 2005]. Retrieved from the Internet <URL: http://www.mapquest.com>.

Montalbano, E., Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Maps & Directions, [online], [retrieved on Aug. 1, 2005]. Retrieved from the Internet <URL: http://maps.msn.com/(ogxuearj4ya5au55fogcdzbt)/Home.aspx.

MSN Virtual Earth—Microsoft Internet Explorer, [online], [retrieved on Aug. 1, 2005]. Retrieved from the Internet URL:http://virtualearth.msn.com, pp. 1-3.

MSN Virtual Earth to Take on Google Earth, [online], [retrieved on Aug. 1, 2005]. Retrieved from the Internet <URL: http://blog.searchenginewatch.com/blog/050523-125208>, pp. 1-4.

MultiMap.com—Online Maps Everywhere, [online], [retrieved on Aug. 1, 2005]. Retrieved from the Internet <URL: http://multimaps.com>.

NASA World Wind, [online], [retrieved on Aug. 1, 2005]. Retrieved from the Internet <URL: http://worldwind.arc.nasa.gov/>, pp. 1-2.

Rabinovich, B., et al., "Visualization of Large Terrains in Resource-Limited Computing Environments," Proceedings of the 8th IEEE Visualization '97 Conference, Oct. 19-24, 1997, pp. 95-102, Phoenix, Arizona.

TerraServer-USA, [online], [retrieved on Aug. 1, 2005]. Retrieved from the Internet <URL: http://terraserver.homeadvisormsn.com/>.

whereis.com—Search Australian Maps, [online], [retrieved on Aug. 1, 2005]. Retrieved from the Internet <URL: http://www.whereis.com/whereis/home.jsp>.

Yahoo! Maps, Driving Directions, and Traffic, [online], [retrieved on Aug. 1, 2005]. Retrieved from the Internet <URL: http://maps.yahoo.com>.

* cited by examiner

COLLABORATIVE DRIVING DIRECTIONS

BACKGROUND

1. Field of the Invention

This invention relates generally to digital mapping systems, and more particularly to collecting, storing, and generating driving directions based on human-provided directions available on the internet.

2. Background of the Invention

Many internet users rely on driving directions provided by mapping websites. Based on an origin and a destination, such websites generate directions along a route determined by a computer algorithm using digitized map information. The resulting directions are customized to the user's start and end points, and save the user the trouble of obtaining a map, figuring out a route, and determining a set of directions based on the route.

Despite these advantages, computer-generated driving directions have certain limitations. Computer-generated directions can be needlessly complicated. For instance, a computer may parse a pathway into a series of small directions (e.g., "slight right onto 24E, exit onto 880N, and exit onto 24E.") that any human would simplify into a single direction. (e.g., "merge onto 24E.") Computers also have a limited ability to incorporate human preferences that favor, for instance, routes that avoid complex intersections or highly congested areas, or which rely primarily on large thoroughfares rather than small streets, over the shortest distance route. Computers also generally provide directions based on streets, which may be poorly signed or difficult to find, rather than landmarks or other signposts that are more intuitive to humans. These problems are compounded by the use of digitized mapping information that does not reflect changing road conditions or is otherwise out of date.

For the reasons described above, the best directions are arguably still the ones provided by humans. Directions provided by a person to her house, for instance, are likely to outline the most straightforward route to that particular destination. Likewise, directions distributed by a business, are likely to provide the best route for getting to the location of the business. Often, such human-endorsed directions are available on the internet, however there is no easy way to access them except in connection with the website of the specific destination.

Thus, there is a need for a way to improve access to and the usefulness of human-provided directions.

SUMMARY

A method of generating a set of directions is disclosed. In an embodiment of the invention, a request for a set of directions to a destination is received from a client device. In response to the request, a database that stores human-provided directions that have been obtained from a plurality of websites is accessed. Based on at least one human-provided direction stored in the database, a set of directions to the destination is generated and provided to the client device. A plurality of sets of directions to the destination, each set of directions based on at least one human-provided direction stored in the database, may also be generated. Each set of directions is scored based on a measure of directions quality.

Also disclosed is a computer-implemented method for collecting and storing human-provided directions. The method comprises receiving a plurality of direction inputs, each input comprising human-provided directions to a destination. Each input is parsed, and a set of human-provided directions extracted therefrom. The set of human-provided directions extracted from each input is stored in a database. In an embodiment, a quality of a set of extracted human-provided directions is evaluated, and storing the set of extracted human-provided directions is performed if the quality is above a certain quality threshold.

In another embodiment, a system for serving human-provided directions is provided. The system includes a human-provided directions module for receiving and processing human-provided directions, a database for storing human-provided directions processed by the human-provided directions module, and a directions generator for receiving a directions query from a client, and, responsive to the query, accessing the database, retrieving at least one human-provided direction and generating a set of directions based thereupon, and providing the generated set of directions to the client.

Figure 1:
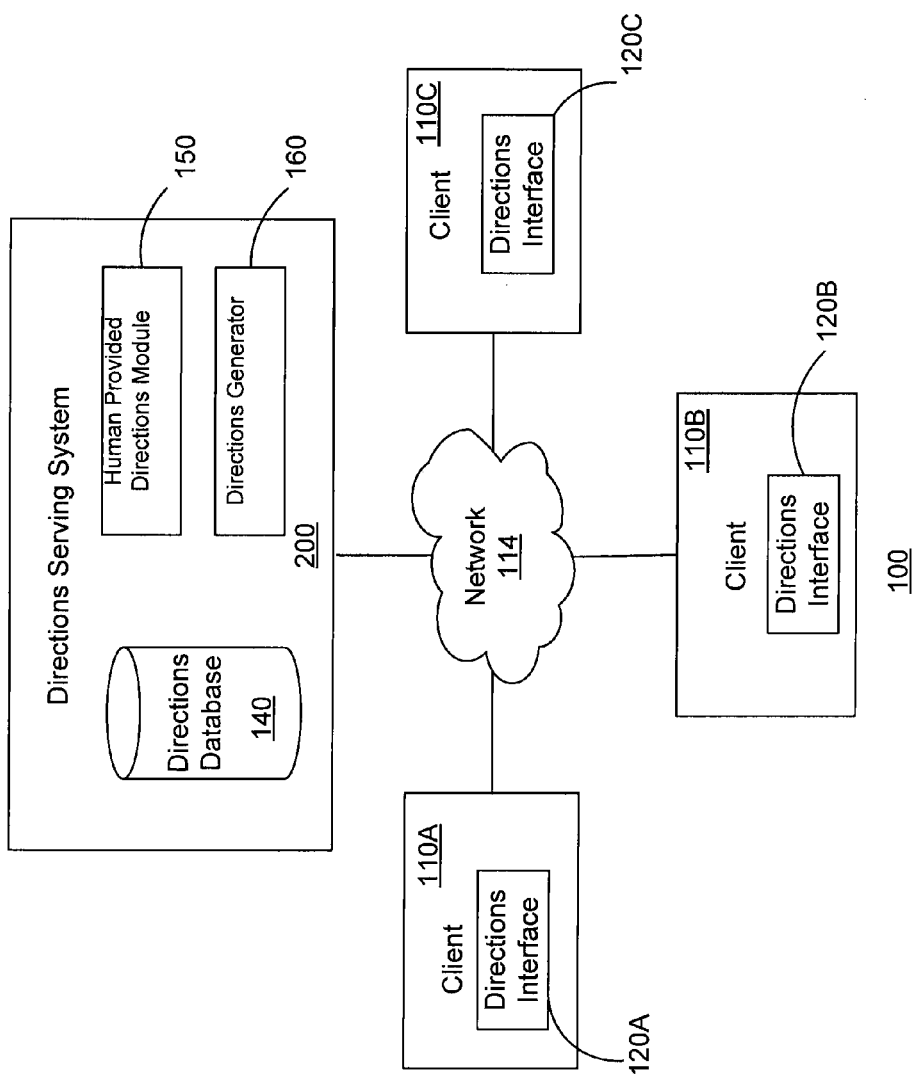
FIG. 1 is a block diagram of a digital mapping system configured to provide collaborative driving directions in accordance with one embodiment of the present invention.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Techniques are disclosed that provide driving directions based on human-provided directions collected from the internet. The features and advantages described herein are not all-inclusive and, in particular, many additional features and advantages will be apparent to one of ordinary skill in the art in view of the figures and description. It should also be noted that the language used in the specification has been principally selected for readability and instructional purposes, and not to limit the scope of the inventive subject matter. Furthermore, the description herein focuses on the human-provided and collaborative aspects of a system for generating directions. Other direction generation system functionalities and components not shown or otherwise discussed, whether conventional or custom, can be used as desired in conjunction with providing human-provided driving directions, as will be apparent in light of this disclosure.

General Overview

As previously described, human-provided directions to a destination are likely to be more accurate and useful than directions generated solely using conventional computer techniques. "Human-provided" directions are understood to comprise directions that are available on the internet and can be collected from various websites and which are not computer generated in response to a user's specific request for directions. Such directions can be created using any of a variety of techniques depending on the context. For instance, they may comprise an individual user's narrative description of a route with which the user has familiarity. Alternatively, they may be based on computer-generated directions that are vetted and/or edited by humans before being posted on the internet.

Such human-provided directions are generally expressed in ways that are more intuitive to humans than solely computer-generated directions. For example, they are more likely to make reference to landmarks such as buildings, stoplights, blocks, monuments, or other geographic features, as in "make a right at the gas station at the corner," or "go three blocks, then make a left." Human-provided directions also usually reflect local knowledge of an area and incorporate tradeoffs, for example, between ease of travel and distance, which are difficult for a computer to successfully take into account. However, human-provided directions on the internet are not generally well-indexed. In addition, they often comprise directions that originate from a common landmark, starting route, or cardinal direction, rather than from a driver's actual starting point. For example, they may originate "from 1-5" or "from the south."

Numerous benefits can be realized when human-provided directions available on the internet are supplemented with conventional techniques for computerized direction generation to produce "collaborative directions." As used herein, the term "collaborative directions" refers to directions that are generated and based on one or more sets of human-provided directions. The share of any given collaborative directions set that is human-provided may vary. In some cases the directions may be comprised wholly human-provided directions. In others, the share of computerized directions may be small, included in a set of directions the majority of which are computer-generated. Human-provided directions from a variety of sources may be collected and stored in a common directions store, thereby reflecting a collaboration between multiple contributors. Human-provided directions may also be supplemented with computer-generated portions combined in one of a variety of ways. Thus, in accordance with embodiments of the invention, disparate sets of human-provided directions are combined and "glued" together with individual computer-generated direction segments. Or, a computer generated map could be used to supplement human-provided directions. A human-provided route can also be supplemented with calculated path lengths. Or a set of computer-generated directions to the starting point of a set of human-provided directions can be combined with the human-provided directions set to produce a point-to-point set of directions. Other combinations of human-provided directions and computer-generated directions are also possible.

A user can request collaborative driving directions using a mapping application. In an embodiment, the degree to which a set of directions reflects human-provided directions or is in other words "humanized," can be specified by a user. The results may be scored and ranked based on the degree of localization. In this way, individual users can get directions suited to their preferences. Driving directions can be provided in conjunction with a map that includes an overlay of the driving directions in graphical form. The map may be generated using tile-based, non-tile vector-based, or raster-based mapping systems. Likewise, other embodiments of the present invention can be used to provide textual and/or verbal collaborative driving directions with no map or other graphics.

The techniques described herein can be employed in any number of mapping applications, such as desktop mapping systems, portable device mapping systems (e.g., smart phones and PDAs), and in-car navigation systems. In addition, using the techniques describes, directions could be extracted or "scraped" from any computer network or information source, including non-internet sources, that includes sets of human-provided driving directions. Numerous other benefits will be apparent in light of this disclosure.

Digital Mapping System Architecture

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," "110B," and/or "110C" in the figures).

FIG. 1 is a block diagram of a digital mapping system 100 configured to provide collaborative driving directions in accordance with an embodiment of the present invention. The system 100 includes a directions serving system 200 and several client devices 110 communicatively coupled to the serving system 200 via a network 114. Each client 110 includes a directions interface 120 for requesting and receiving driving directions from the directions serving system 200. The directions serving system 200 includes a directions generator 160, human-provided directions module 150, and directions database 140. Upon receiving a request for directions from a client 110, the directions serving system 200 can generate a route and provide human-provided directions stored in the directions database 140 that match the route to a user of a client device 110.

The network 114 enables data communication between and among the entities shown in FIG. 1 and in one embodiment is the Internet. In another embodiment, the network 114 is a proprietary local area network (LAN) or wide area network (WAN) operated by a mapping or directions service that may or may not include Internet-based connections. In one embodiment, the network 114 uses standard communications technologies and/or protocols. Thus, the network 114 can include links using technologies such as Ethernet, 802.11, integrated services digital network (ISDN), digital subscriber line (DSL), and asynchronous transfer mode (ATM). Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) and/or other formats. In addition, all or some of links can be encrypted using conventional encryption technologies such as the secure sockets layer (SSL), Internet Protocol security (IPsec), Secure HTTP and/or virtual private networks (VPNs). In another embodiment, the entities can use custom and/or dedicated data communications technologies instead of, or in addition to, the ones described above.

The system 100 comprises a plurality of client devices 110 for communicating with the directions serving system 200. A user using a client device may use a directions interface 120 to request directions to a destination. The request is received and filled by the directions serving system 200 which returns the directions to the client device 110 through the directions interface 120. In an embodiment, through the directions interface 120, the user can alternatively provide directions data to be used by the directions serving system 200. Such data may comprise actual directions (e.g. directions to the user's house, or to a child-friendly itinerary in a metropolitan city), or information that the directions serving system 200 can use to improve the quality of the directions it generates, such as ratings of sets of directions previously provided, corrections to such directions, and/or ratings of direction sources or direction generation techniques.

In one embodiment, the client device 110 is a typical personal computer such as an IBM-PC or Apple Macintosh compatible computer. In another embodiment, the client device 110 is another type of electronic device, such as a mobile telephone, personal digital assistant (PDA), portable email device, or navigation device such as a geographic positioning satellite (GPS) device. The client device 110 may also comprise a navigation system located in or integrated into a vehicle or transportation device. Generally stated, the client device 110 can be any device that allows a user to access the direction serving system 200 via the network 114. Each directions interface 120 comprises an application adapted for use on a client device 110. In an embodiment, one or more directions interface 120 comprises a browser (or other similar application) that a user of a client device 110 can use to communicate with the directions serving system 200. Examples of browsers include Microsoft's Internet Explorer browser, Netscape's Navigator browser, Mozilla's Firefox browser, PalmSource's Web Browser, or any other browsing or application software capable of communicating with network 114. The directions interface may also be included in a specialized application such as Google Earth for the computer, personal digital assistant or mobile phone versions of Google Maps, or a vehicle navigation system. In the context of a car navigation system, the directions serving system 200 may also comprise voice recognition and/or voice generation modules for receiving requests for and providing directions in voice form.

The directions serving system 200 comprises a human-provided directions module 150, directions database 140, and directions generator 160. The human-provided directions module 150, described in greater detail below with reference to FIG. 2, collects or receives human-provided directions from various sources, then scores and processes the directions. As used herein, the term "module" can refer to computer program logic for providing the specified functionality. A module can be implemented in hardware, firmware, and/or software. Preferably, a module is stored on a computer storage device, loaded into memory, and executed by a computer processor. Once processed by the human-provided directions module 150, human-provided directions are stored in the directions database 140.

The directions database 140 comprises a map database supplemented with human-provided directions and directions' meta data provided by the human-provided directions module 150. The database comprises geographic data upon which driving routes, maps, and directions can be determined, and may be implemented as one or more relational database management system (RDBMS), lightweight database access protocol (LDAP), flat file, and/or other databases, or using another database architecture. In an embodiment, the database 140 comprises raster- or tile-based map images of various longitude and latitude coordinates provided by a geographic information system (GIS), for instance a satellite GIS. In one particular embodiment, the information within the database 140 is organized into map layers, such as a terrain layer, road layer, and border layer. In an embodiment, human-provided directions and associated metadata about the directions are stored in their own layer, however in another embodiment, the directions and data are stored as annotations to map segments.

The database 140 is communicatively coupled to a directions generator 160. The directions generator 160 comprises a module that processes requests for directions from clients 110 and generates directions based on the requests. During the directions generation process, the directions generator 160 accesses route information and human-provided directions stored in the directions database 140. As described in more detail below in connection with FIG. 3, in an embodiment, one or more of the functions of the directions generator 160 is carried out by a path generator 310, directions scorer 320, and direction presentation module 330.

The directions serving system 200 may be part of a larger system that delivers directions and related services to requesting clients 110. The system may provide, for instance, the geographic location of a street address, maps and images of geographic locations or routes, and location-specific results to a query (e.g., as with the Google Local Search service). Other services such as trip planning, event management, or local business directory services and/or other applications and elements may be provided. In an embodiment, the system 200 provides HTML (hypertext markup language), images, scripting language (e.g., JavaScript, JScript, Visual Basic Script), XSLT (extensible stylesheet language transformation), and other static elements that are used by a directions interface 120 on a client device 110. The directions serving system 200 may include one or more servers operating under a load balancing scheme, with each server (or a combination of servers) configured to respond to and interact with the client devices 110. The directions serving system 200 can be implemented with conventional technology, as will be apparent in light of this disclosure.

In general, a user enters a request for directions through a directions interface 120 of a client device 110. The request identifies a destination and may also specify an origin, although the origin information may be inferred based on other data, for instance the global position of the requester or previously provided information about the requester's location that may be stored, for instance, in a cookie, along with the user's preferences, or as part of the user's profile. The request may be in the form of a text string, a voice command, an input to a touch screen, a selection from a menu of destination choices, and/or another form. The request is received through the directions interface 120 and sent to the directions serving system 200 via the network 114. In an embodiment, the user's preferences regarding one or more of the format of the provided directions, the route reflected by the directions, and the directions themselves is also supplied as part of the request.

The user may specify, for instance, preferences regarding the format of the provided directions such as whether such directions should be provided in text, map, or route form, as well as provide input regarding the route to be generated. This input may reflect, for instance, the user's preferences for freeway vs. local roads, minimum travel distance vs. minimum likely traffic congestion, or other such factors. The user may also provide preferences regarding the directions themselves regarding, for instance, whether human-provided vs. computer-generated directions are favored, the importance of landmarks and colloquial language, and the language preferences of the users.

Such preferences may be supplied explicitly, for example through the user's input to an interface for soliciting user preferences. The preferences may also comprise implicit preferences, for instance inferred based on the user's historical behavior when rating or selecting direction sets (for example, the user always chooses the direction set with the most landmarks, or the Spanish language directions), or through a user selection at the time of request or earlier. In an embodiment, sets of directions are scored based at least in part on the extent to which they include human-provided directions, and the user's preferences are used to determine the weightings given to various factors. The directions serving system 200 uses these inputs to determine a route and a set of directions corresponding to the route, and creates an appropriate output based on the characteristics of the requesting client 110. In an embodiment, a single directions serving system 200 is capable of providing directions to a plurality of different types of clients 110, for instance a computer 110A, cellphone 110B, and navigation system 110C, each in the appropriate format.

In the system 100 shown, the directions serving system 200 hosts a directions generator 160, human-provided directions module 150, and directions database 140. As one of skill in the art will know, however, any of a variety of configurations may be used to implement embodiments of the invention. The directions generator 160, for instance, may be implemented as a client-side application and multiple copies may be hosted on client computers 110. Likewise, one or more elements of the directions serving system 200 may be provided by a third party or server external to the server shown.

Directions Serving System

Figure 2:
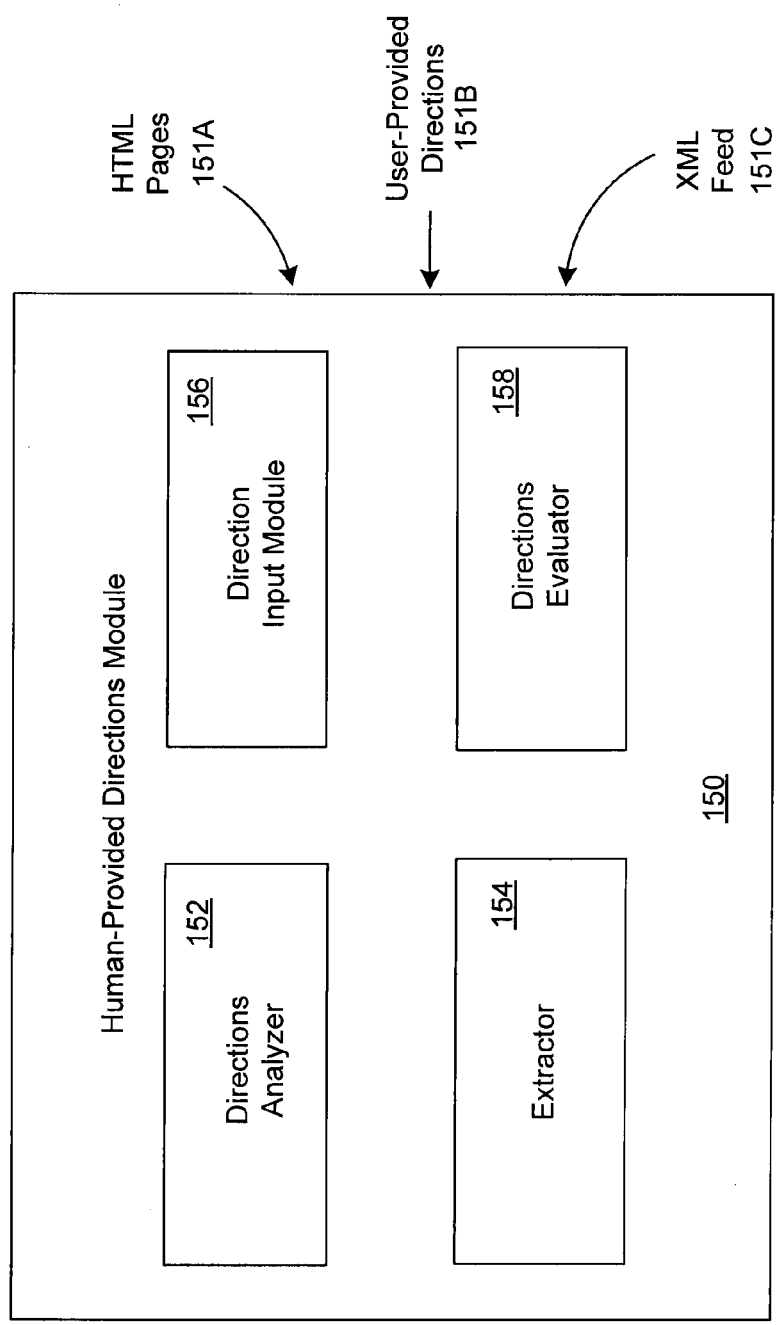
FIG. 2 is a block diagram of the human-provided directions module of the directions serving system shown in FIG. 1 in accordance with one embodiment of the present invention.

FIG. 2 is a block diagram of a human-provided directions module 150 of the directions serving system 200 shown in FIG. 1 in accordance with one embodiment of the present invention. As described earlier, in an embodiment the directions serving system 200 includes a directions database 140 that comprises a core map database and human-provided direction annotations to the map segments within the map database. The human-provided directions are supplied by a human-provided directions module 150 that receives direction inputs 151 from a variety of sources. The inputs 151 contain human-provided directions that are extracted and analyzed in view of their context by the human-provided directions module 150 before being provided in the directions database 140.

The human-provided directions module 150 comprises a direction input module 156, an extractor 154, a directions analyzer 152, and a direction evaluator 158. The direction input module 156 comprises one or more modules for collecting or receiving human-generated directions from a variety of sources 151. It includes a crawler for browsing and finding pages on the internet that contain human-provided directions. Such pages may include, for instance, business websites that provide directions to a business address, event websites that provide directions to personal or corporate events, and travel or related websites that contain direction information. When the crawler identifies a source that it recognizes as likely to contain directions, whether identified by keyword, format, or other marker, it issues an HTTP GET request to retrieve one or more HTML pages 151A, XML data, or data provided in another format, such as an XML feed 151C. The direction module 156 may also accept user-provided directions 151B, for instance, through a user interface for soliciting human-provided directions. Such interface may comprise a community bulletin board, forum, or other on-line environment for which submissions in a variety of forms such as email, uploaded documents, or selection on a map or specialized directions interface may be provided.

Directions in one or more of these forms are provided from the direction input module 156 to the extractor 154, which processes the inputs 151 and extracts human-provided directions from their context. For example, the extractor 154 may take an HTML page, parse the page, and retain directions and other directions-related information contained in the page. The extractor 154 can retain directions-related information that includes context from which the destination address of the directions can be inferred or a human-provided map that accompanies the directions, while discarding other non-directions related text, images, graphics, and formatting. In an embodiment, the extractor 154 also retains metadata data about the directions and their context that can be used to evaluate their quality. Such data may include the website the directions were taken from, and, for directions provided from a non-website source, such as email or an XML feed, the form of the submitted directions, the identity or email address of the submitter, or other proxies by which the quality of the directions can be evaluated. In an embodiment, the direction input module 156 receives or obtains directions in multiple languages. In an embodiment, the extractor 154 processes only directions in one language, e.g. English, and discards directions in other languages; in another, it identifies the language of each direction set and saves the language information in a language tag or other memory associated with the directions.

The directions evaluator 158 comprises a module for making an initial assessment regarding whether a given set of extracted directions should be further processed and stored in the directions database 140. For a given set of directions, it receives the directions, directions-related information, and extrinsic data collected by the extractor 154. If the directions do not already have a destination address, the evaluator 158 infers the destination based on the directions-related information provided by the directions extractor 154. The evaluator 158 also evaluates one or more measures of directions quality using data provided by the extractor 154 as described earlier, such as the source website or the identity of the source and the form in which the directions were provided. In an embodiment, the evaluator 158 evaluates the metadata about a directions set by reference to other information. For instance, in an embodiment the evaluator 158 retrieves a measure of page importance of the website from which the directions were collected. In another embodiment, the evaluator 158 can infer from the website address, alone or in conjunction with other information, whether the directions represent "official directions" to a place of business provided by the business itself, or derive from a personal website (for instance having a "myspace.com" or other social networking url), public forum (for instance, posted in comment form on a blog), or other known or unknown source. The evaluator 158 may also evaluate intrinsic qualities of a set of directions as additional indicia of direction quality. For instance, the evaluator 158 may perform semantic analysis to assess various aspects of a set of directions including the number of landmarks or non-street placemarks referenced in the directions and the use of colloquial rather than formal language (e.g. "turn right onto Lawton Avenue" vs. "take your third right, at the liquor store"). Based on one or more of these or other measures, in an embodiment, the evaluator 158 assigns one or more quality scores to the human-provided directions.

In an embodiment, directions that receive too low a score are filtered out and discarded, rather than processed and added to the directions database 140. In an embodiment, there is a predetermined threshold score for directions below which directions should not be processed. In another embodiment, however, a comparison is made during processing between a set of human-provided directions to be added to the database 140 and comparable directions, i.e. to the same or nearby location from a same or nearby origin, already stored in the database. For instance, one might imagine multiple sets of directions to the campus of UC Berkeley to be available on the internet, some of better quality than others. If the human-provided directions being processed have a score that is significantly lower than directions to the same location already stored in the database, for example, the evaluator 158 may also discard them. However, if there is no set of human-provided directions pre-stored in the database 140 to the destination of the human-provided directions, in an embodiment, the human-provided directions are processed regardless of their score. In an embodiment, the score(s) assigned to a set of directions by the directions evaluator 158 are passed along with the directions to the directions analyzer 152 and stay with each direction segment as its being processed. In addition, each set of directions that is deemed to "pass" to the directions analyzer 152 is assigned a unique identifier so that other segments with the same identifier can be identified when a group of directions is being assembled in response to a directions query. Alternatively, the directions evaluator 158 may also or instead perform lower-level checks, in order to filter out directions that look entirely computer generated, or that resemble directions spam or otherwise fabricated or "fake" directions.

Directions that pass the filter of the directions evaluator 158 are passed to the directions analyzer 152. The directions analyzer 152 processes and decomposes each set of directions, and based upon them, produces a group of individual direction segments for storage in the directions database 140. In an embodiment, the directions analyzer 152 performs this computation as a series of steps. First, it breaks down a series of directions into one or more direction sets; for instance, for a set of website directions that comprises directions from the four compass points (N, S, E, W), the analyzer 152 parses the directions on the page into four distinct sets of directions. For each of the sets of directions, it determines the start and end points. Next, the analyzer 152 breaks down each direction set into a sequence of steps. It then places the sequence of steps into correspondence with points on a map, such as longitude and latitude steps. It associates each step with the corresponding path traversed on the map. One or more of the steps described above is performed with reference to the map information stored in the directions database and comprises extracting and using street names and potentially landmark names (together with a yellow pages/database of landmarks) and triangulating or otherwise locating the coordinates on a map that correspond to the textual description. In an embodiment, if a set of directions has too much "unexplained" text or text that is impossible to correlate to a physical address, it is discarded. Once each individual segment has been determined, the analyzer 152 stores the human-provided text description of each step in the direction set in the directions database 140.

The analyzer 152 can also store with each direction metadata about the directions such as: language information about the direction, the score(s) assigned earlier by the directions evaluator 158 to the directions set to which the direction belongs, the unique identifier assigned to each directions set to which the direction belongs, and, in an embodiment, information about the specific location of the direction segment in the direction segment, e.g. how close it is to the destination of the directions set it is part of. The unique identifier information may later be used to award a "coherence" bonus to computer-generated directions that include contiguous steps from the same original set of human-provided directions; for instance, in the form of a bonus for using the same source for a step before or after a given step, and/or for the exclusive or complete use of a set of human-provided directions. Likewise, in an embodiment, the closer a specific direction is to the destination of a directions set, the higher score it receives relative to other steps in the set. This information can be stored as an annotation in a map of the database 140 with the appropriate end points; or as a "layer" that supplements the basic map information in the database.

Figure 3:
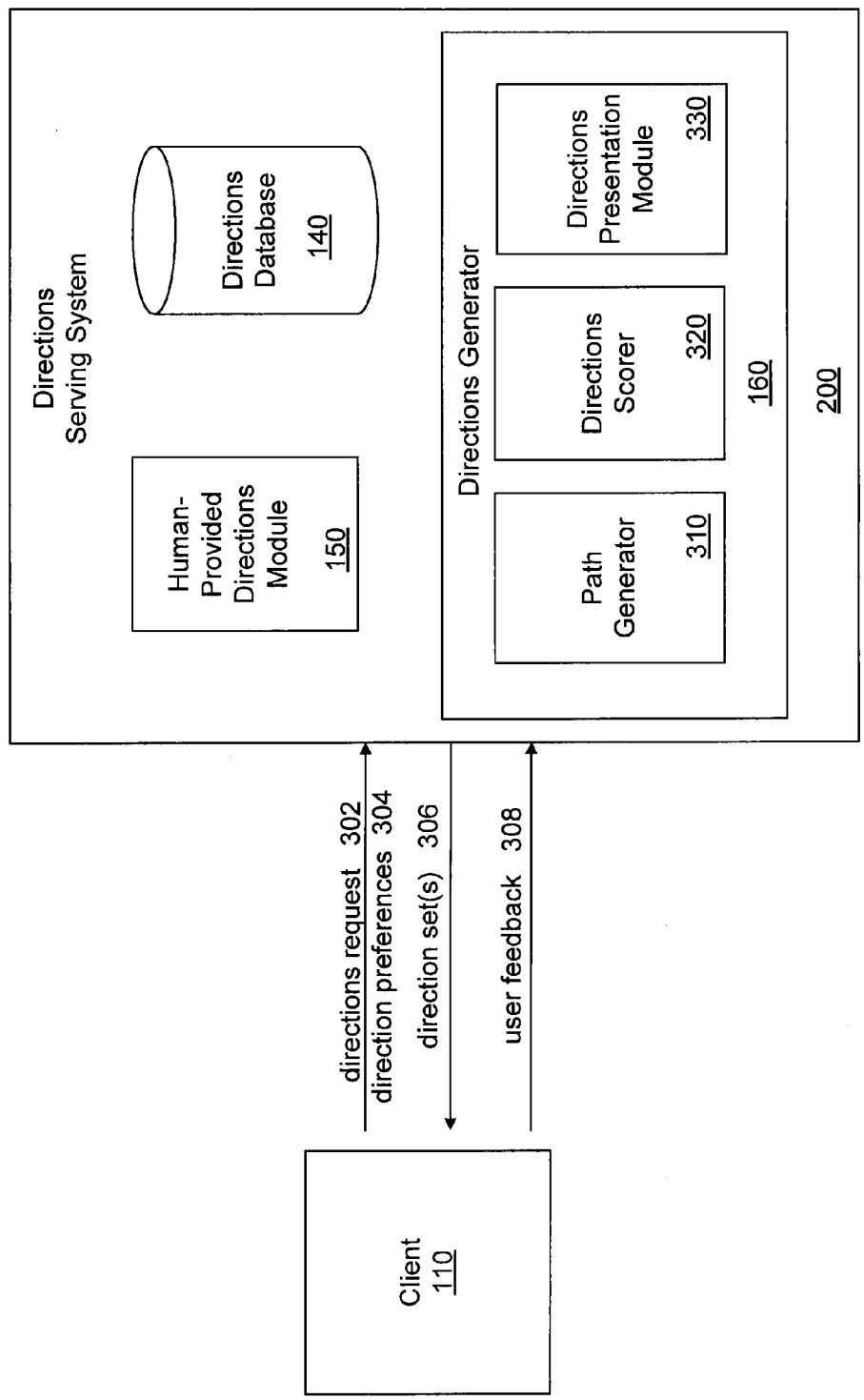
FIG. 3 is a block diagram of the directions serving system shown in FIG. 1 in communication with a client device in accordance with one embodiment of the present invention.

FIG. 3 is a block diagram of the directions serving system 200 shown in FIG. 1 in communication with a client 110 in accordance with one embodiment of the present invention. The client 110 provides a direction request 302 to the directions serving system 200. The directions serving system 200 comprises a human-provided directions module 150 and directions database 140, as described earlier. It also includes a directions generator 160 for generating directions based on the human-provided directions stored in the database 140. In response to a directions request 302 and the preferences 304 of a client 110, the directions generator 160 generates one or more direction sets 306 and provides it to the client 110 in response to the client's query 302 and preferences 304. The client 110 can select from among the provided direction sets 212, and provide feedback 308 to the directions serving system 200 in the form of the client's selection, corrections to the directions, or ratings of the provided directions, for instance.

The directions generator 160 comprises a module for processing a directions request from a client 110, accessing the directions database 140, and generating a set of directions based in part or wholly on human-provided directions. In the embodiment shown, the generator 160 includes a path generator 310, directions scorer 320, and directions presentation module 330. The path generator 310 generates path candidates to the destination requested by the client 110. In an embodiment, the path generator 310 uses one of a plurality of algorithms for best-path generation such as Dijkstra's algorithm. According to this algorithm, routes are explored outwards from the starting point, extending a "frontier" of points reached so far, together with the score (or cost) of getting from the starting point to each point on the frontier. At every step, all possible segments that can be added onto each point on the frontier are considered, to get closer to the desired destination. In an embodiment, the path generator 310 uses a scoring function at each step. Other possible evaluation methods include "A*," an algorithm based on Dijkstra's algorithm that includes an evaluation of the closeness of a given step to the final destination, and "means-ends analysis." For example, applying means-end analysis, the path generator 310 would generate the shortest path at a higher abstraction level, e.g., how to get from California to Massachusetts, then go down the levels of abstraction, e.g., how to get from Mountain View to Boston, until a path to the destination is determined.

Once the candidate path generator 160 has generated a plurality of candidate paths, each candidate path is associated with one or more sets of directions based on human-provided directions stored in the directions database. In an embodiment, the direction preferences 304 of the user favor human-provided directions, and the highest ranked human-provided direction segment available for each direction segment is combined into a collaborative direction set. In another embodiment, this basic algorithm is modified in order to maximize the number of contiguous directions from a single source that are provided, so that, for a given direction segment, a contiguous direction may be favored over a higher ranking direction segment. Where no human-provided directions are available over particular segments, a direction segment generated using conventional computer generation techniques is provided to fill the gap. The directions scorer 320 then scores the direction sets that have been associated with each path generated according to one or more of path quality and the quality of directions available to describe the path. In an embodiment, the direction scorer 320 generates a directions score based on a linear combination, for instance score=a*(route quality)+b*(directions quality), wherein a and b depend on the user's preferences 304, and directions quality=x*(% of segments that are human-generated)+y*(continuity score)+z*(source score), etc, with x, y, and z reflecting weightings based on the user's preferences 304. However, as is known to one of skill in the art, other types of combinations, such as those based on exponentiation or other algebraic calculations are also possible. In addition, factors other than those represented above may be used to determine the directions score. For instance, the calculation of directions quality may incorporate factors other than the ones shown above, such as the use of colloquial language, and/or use of placemarks or landmarks.

Route quality can depend on factors such as total route distance, traffic on the route, estimated travel time, and number of steps. In an embodiment, the user's preferences 304 for various of these factors, e.g., the shortest route, most direct route, etc. is applied to calculate the route quality. Various different factors can also be used to determine directions quality. In the linear combination example provided above, direction sets with a higher percentage of human-generated segments receive a higher score than direction sets with a lower percentage. In addition, a continuity score is assigned that reflects the extent to which segments within a directions set are drawn from the same original set of human-provided directions, which can be determined by a comparison of unique identifier values among directions n the sequence. And in an embodiment, the source score comprises a weighted average of the source scores of each of the direction segments. The source score of an individual direction segment can be based on factors such as the importance of the website from which the segment is derived, measured for instance by a metric such as its "PageRank" (determinable by the quality and quantity of links that point to the page), the reputation of a submitter of the directions, and whether the source comprises the official website of a business to which the directions lead.

After the possible direction sets are generated and scored, the directions presentation module 330 provides one or more of the highest ranking direction sets 306 to the client 110. In an embodiment, the presentation module 330 formats the directions according to the needs of the client application or device 110. In another embodiment, the directions sets 306 are provided to the client 110 in ranked order in accordance with the client's preferences, with the corresponding scores.

The user may select among the presented direction sets 306 provided and provide feedback 308 to the directions serving system 200 based on the usefulness of the directions. In an embodiment, the feedback 308 may take the form of a numerical or other rating of one or more direction sets. Or, the feedback 308 may comprise corrections, comments, or other descriptions made by the user. Such feedback 308 could be prompted, for example, by a seasonal road closure that leads to one or more alternate routes as described by the feedback submitter 110. These various forms of feedback 308 are stored in the database 140 and may be used to improve the quality of future directions. For example, corrections to specific direction segments may be stored as a new direction set or a replacement or supplement to the original direction segment. In addition, direction ratings may be stored with the individual directions segment or set, to be later used to score a direction set.

Figure 4:
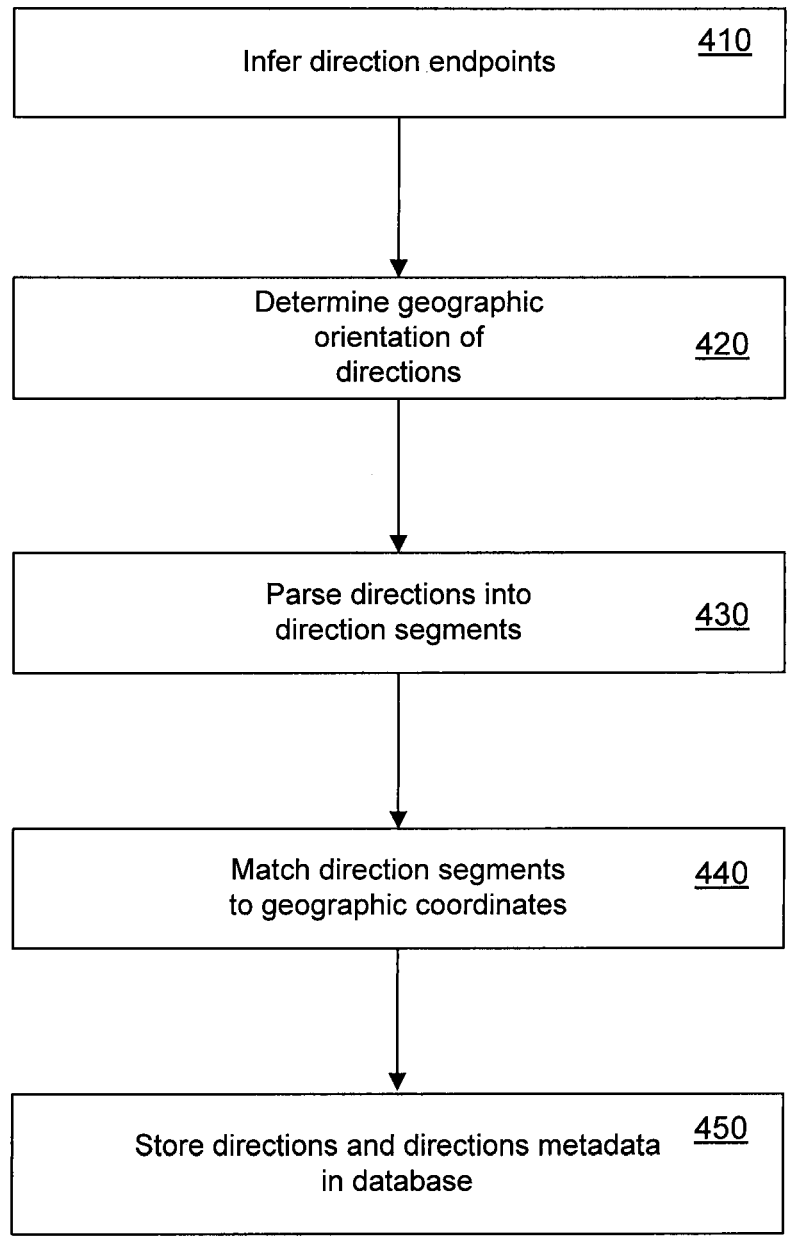
FIG. 4 is a flow chart illustrating a process for analyzing and storing human-provided driving directions in accordance with an embodiment of the invention.
Figure 5:
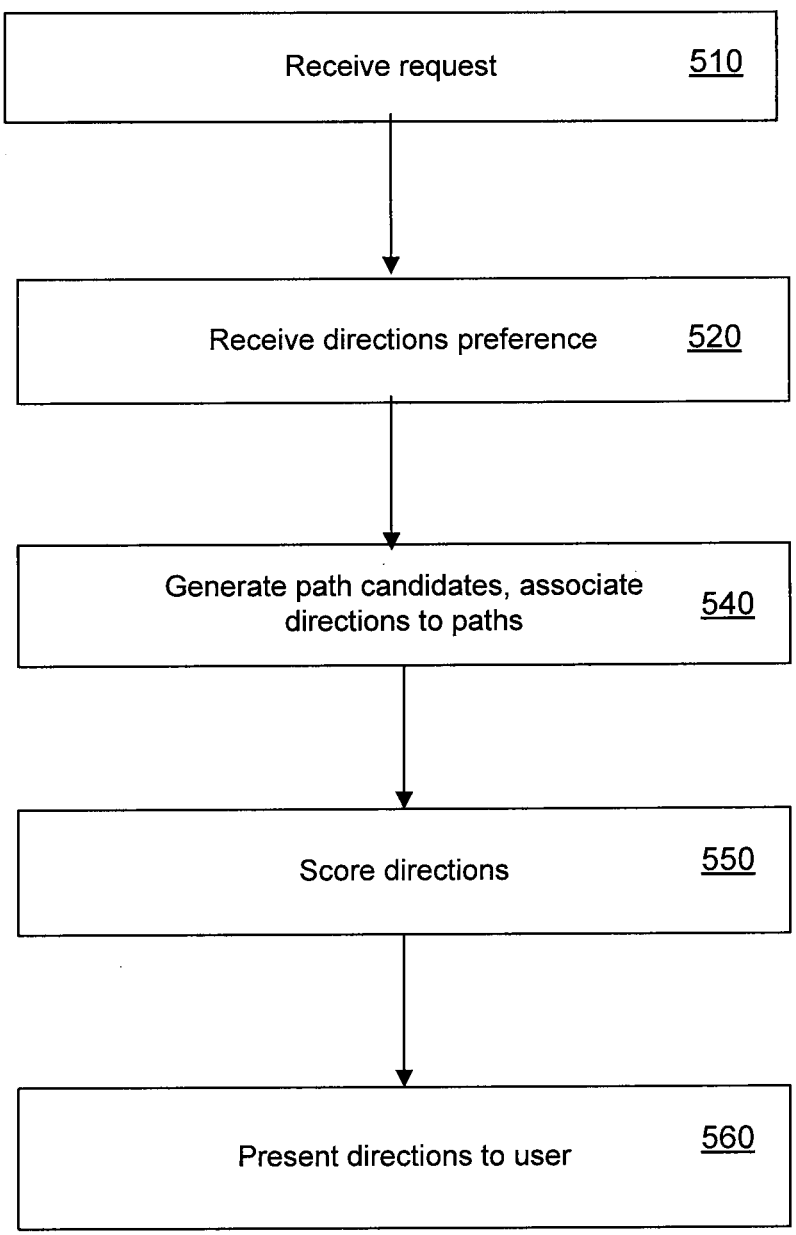
FIG. 5 is a flow chart illustrating a process for generating directions in response to a user request in accordance with an embodiment of the invention.

FIGS. 4 and 5 are flow charts illustrating steps for performing various methods of embodiments of the invention. Not every possible step is shown in the figure. In addition, some embodiments perform different steps in addition to, or instead of, the ones described herein. Furthermore, the order of the steps can vary from that described herein. In other embodiments, some or all of the steps are performed by entities other than those described.

Analyzing Human-Provided Directions

FIG. 4 is a flow chart illustrating a process for analyzing and storing human-provided driving directions in accordance with an embodiment of the invention. In an embodiment, prior to performance of the method of FIG. 4, a human-provided directions input 151 in the form of a webpage is provided to a human-provided directions module 150. In an embodiment, the directions portion of the webpage is extracted from the input by the extractor 154. A quality control check is then performed by a directions evaluator 158, which in an embodiment filters out or removes certain types of directions, such as those that appear to be strictly computer generated. In an embodiment, a crawler crawls the internet on a regular basis to collect human-provided directions inputs for processing. The crawling and subsequent processing steps are performed "off-line", that is, independent of a particular request for directions. Furthermore, one or more of the steps may take place at various times and be performed by various computer servers depending on process resource configuration and availability.

The method of FIG. 4 begins when a set of extracted directions and additional data about the directions are provided to a directions analyzer 152 for processing and storage. The directions analyzer 152 takes the direction set and infers 410 the starting and destination points of the directions. This information may be contained on a website that holds the directions, or may need to be inferred 152 for instance using an electronic yellow pages or other business directory in conjunction with the name of the business on whose website the directions appear. Once the endpoints have been determined, the geographic orientation of the directions is determined 420, that is whether the directions represent a routing of N to S, E to W, etc. Semantic analysis is used to further parse 430 the directions into individual direction segments. For instance a direction set that outlines a path from A to F could be parsed 430 into individual segments including A to B, B to C, C to D, D to E, and E to F. Next, the direction segments are matched 440 to their geographic coordinates on a map. Cues such as street names, intersections, and landmarks are used to determine the exact location of a direction segment. The segment directions are stored 450, along with metadata about each direction such as its source, proximity to the destination of the directions set it is a part of, or other such data, in a directions database 140. In an embodiment, the database stores directions in several different languages. The extracted directions set can be stored 450 in a layer that is reserved for human-provided directions in the same language. Or, in another embodiment, the directions are stored as annotations to the geographic data stored in the database, along with a language identifier by which such directions can be filtered.

Generating Human-Provided Directions

FIG. 5 is a flow chart illustrating a process for generating directions in response to a user request in accordance with an embodiment of the invention. A directions serving system 200 receives 510 a request from a client requesting directions. The system 200 also receives 520 directions preferences from the user in the form of implicit preferences inferred based on the user's past direction choices and selections. In an embodiment, the preferences specify that the user favors directions that have landmarks, and which are human-provided rather than computer generated, even if that means that the directions provided might represent a longer route than the shortest route generated using conventional techniques for generating driving directions. In an embodiment, the user is recognized as having exclusively selected and accessed directions that are in English in the past, and based upon this, the user's preference for English language directions is inferred and used to process the request.

Based on the request, one or more path candidates are generated 540, in an embodiment by the path generator 310 of FIG. 3. The path generator 310 may use one or more of the algorithms described in connection with FIG. 3, or another algorithm. A set of directions in the appropriate language is associated with each of the path candidates. Consistent with the user's preference for human-provided directions, human-provided directions are used whenever possible in order to determine a set of directions for each path. Each set of resulting directions is then scored 550 based on various aspects of the directions and route represented. The user's preference for landmarks is taken into consideration in assigning scores to each set of directions. The top 20 sets of directions are presented 560 to the user in rank order with the score of each direction also provided.

One or more of the steps shown in FIG. 3 may be performed by elements on the client or server side. For instance, in an embodiment, the directions generated by the directions serving system 200 are with direction search results derived from other sources, such as a local desktop search utility of the user. Combining and presenting 560 the results is performed locally at the client side.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A computer implemented method of generating a set of directions, the method comprising:
   storing a database of driving directions, including human-provided directions that have been extracted by automatically parsing text of webpages from a plurality of websites;
   receiving a request for a set of directions to a destination from a client device;
   responsive to the request, generating a set of directions to the requested destination based on at least one human-provided direction stored in the database; and
   providing the generated set of directions to the client device.

2. The method of claim 1, further comprising:
   generating a plurality of sets of directions to the destination, each set of directions based on at least one human-provided direction stored in the database;
   scoring each generated set of directions based on a measure of directions quality; and
   providing the generated set of directions with the highest score of the plurality of generated sets of directions to the client device.

3. The method of claim 1, wherein the request comprises a user direction preference and the directions are generated responsive to the user direction preference.

4. The method of claim 3, wherein the user direction preference comprises at least one of: a user direction preference inferred based on past user behavior, a preference for human-provided directions, and a preference for directions that include non-street landmarks.

5. A computer program product comprising a computer readable medium with code for execution on a computer, including the code for performing the method comprising:
   receiving a plurality of direction inputs, each input comprising human-provided directions to a destination, the direction inputs including at least webpages from a plurality of websites;
   automatically parsing text of each direction input and extracting a set of human-provided directions therefrom;
   determining a rating for each set of human-provided directions; and
   storing in a database each set of human-provided directions and its rating.

6. The computer program product of claim 5, wherein determining comprises evaluating the share of directions in each set of human-provided directions that is human-provided.

7. The computer program product of claim 5, wherein determining comprises evaluating an importance rating of a direction input from which a set of human-provided directions has been extracted.

8. The computer program product of claim 5, wherein determining comprises evaluating an extent to which directions in a set of human-provided directions represent contiguous human-provided directions from a common source.

9. The computer program product of claim 5, wherein determining comprises evaluating an extent to which non-street landmarks are referenced in a set of human-provided directions.

10. The computer program product of claim 5, wherein determining comprises evaluating at least one of: an extent to which colloquial language is used in a set of human-provided directions, and user ratings of directions in a set of human-provided directions.

11. The computer program product of claim 5, further comprising providing the plurality of generated sets of directions and the scores of each of the generated sets of directions to the client device.

12. The computer program product of claim 5, comprising retrieving with a crawler direction inputs in the form of webpages from a plurality of websites, wherein the webpages include human-provided directions.

13. The computer program product of claim 5, wherein the plurality of direction inputs are provided in a plurality of languages, and wherein the method comprises storing in the database information about the language of the plurality of languages of each set of human-provided directions.

14. The computer program product of claim 5, wherein a direction input of the direction inputs comprises: a set of directions submitted by a user and corrections to a set of directions provided by a user.

15. The computer program product of claim 5, wherein extracting comprises extracting context information from which the destination of the set of human-provided directions can be determined.

16. The computer program product of claim 5, wherein storing is performed when a rating for a set of human-provided directions is above a pre-determined threshold.

17. The computer program product of claim 5, wherein the database comprises a map database, and storing comprises one of: adding each human-provided direction to a data layer comprising human-provided directions, and annotating route segments in the map database with each human-provided direction.

18. The computer program product of claim 5, wherein the method further comprises storing metadata about each set of human-provided directions.

19. A system for generating and serving directions, the system comprising:
a human-provided directions module for receiving and processing human-provided directions, wherein processing human-provided directions includes at least extracting human-provided directions by automatically parsing text of webpages from a plurality of websites;
a database for storing human-provided directions processed by the human-provided directions module;
a directions generator for receiving a directions query from a client, and, responsive to the query:
accessing the database and retrieving at least one human-provided direction therefrom;
generating a set of directions based on the at least one human-provided direction and one or more computer-generated directions; and providing the generated set of directions to the client.

20. The system of claim 19, wherein the human-provided directions module comprises a directions analyzer for decomposing a set of human-provided directions received by the human-provided directions module into individual direction segments for storage in the directions database.

21. The system of claim 20, wherein decomposing comprises determining a start point and an end point for the set of human-provided directions.

22. The system of claim 20, wherein decomposing comprises determining the geographic orientation of a set of human-provided directions.

23. The system of claim 20, wherein decomposing comprises associating an individual direction of the set of human-provided directions with a path on a map.

24. The system of claim 20, wherein decomposing comprises one or more of: determining a start point and an end point for the set of human-provided directions and associating an individual direction of the set of human-provided directions with a path on a map.

25. The system of claim 19, wherein the human-provided directions module comprises an extractor for automatically parsing each of a plurality of direction inputs and, for each of the direction inputs, returning a set of human-provided directions.

26. The system of claim 19, wherein the human-provided directions module comprises a directions evaluator for evaluating the quality of human-provided directions, and responsive to a determination that a set of human-provided directions is of below a threshold quality, discarding the set of human-provided directions.

27. The system of claim 19, wherein the directions generator comprises a path generator for generating a plurality of path candidates based on the directions query.

28. The system of claim 19, wherein the directions generator comprises a directions scorer for scoring a plurality of direction candidates generated responsive to the directions query.

29. The system of claim 19, wherein the human-provided directions module is configured to receive human-provided directions in the form of at least one of: a webpage, an XML feed, a user-provided direction correction, and a user-provided direction.

30. A computer implemented method of generating directions, comprising:
retrieving, from a plurality of websites, webpages comprising directions;
automatically parsing text of each webpage and extracting a set of directions therefrom;
scoring each set of directions based on a measure of quality;
selectively retaining sets of the directions based on their respective scores; and
storing in a database each retained set of directions.

31. The method of claim 30, wherein the directions are human-provided driving directions.

32. The method of claim 31, further comprising:
responsive to at least one set of directions not being associated with a destination, inferring a destination for the set of directions from a context of the webpage from which the set of directions were extracted.

33. The method of claim 30, wherein the measure of direction quality for a direction is based upon a source website of the webpage from which the direction was extracted.

34. The method of claim 30, wherein the measure of direction quality for a direction is based upon a measure of an importance of the webpage from which the direction was extracted.

35. The method of claim 30, wherein the measure of direction quality for a direction is based upon information indicating whether the directions are to a place of business, and extracted from a website provided by the business itself.

36. The method of claim 30, wherein the measure of direction quality for a direction is based upon a number of landmarks included in the directions.

37. The method of claim 30, wherein retrieving, from a plurality of websites, webpages comprising directions comprises:
identifying a website that contain directions based on at least one keyword contained in the website.

38. The method of claim 30, wherein automatically parsing each webpage and extracting a set of directions therefrom comprises:
retaining from a webpage the directions, direction-related context associated with the directions, and metadata associated with the directions; and
discarding text, graphics, images, or formatting not related to the directions.

39. A computer program product comprising a computer readable medium with code for execution on a computer, including the code for performing the method comprising:
retrieving, from a plurality of websites, webpages comprising directions;
automatically parsing text of each webpage and extracting a set of directions therefrom;
scoring each set of directions based on a measure of direction quality;
selectively retaining sets of the directions based on their respective scores; and
storing in a database each retained set of directions.

40. The computer program product of claim 39, wherein the directions are human-provided driving directions.

41. The computer program product of claim 39, the method further comprising:
responsive to at least one set of directions not being associated with a destination, inferring a destination for the set of directions from a context of the webpage from which the set of directions were extracted.

42. The computer program product of claim 39, wherein the measure of direction quality for a direction is based upon a source website of the webpage from which the direction was extracted.

43. The computer program product of claim 39, wherein the measure of direction quality for a direction is based upon a measure of an importance of the webpage from which the direction was extracted.

44. The computer program product of claim 39, wherein the measure of direction quality for a direction is based upon information indicating whether directions are to a place of business, and extracted from a website provided by the business itself.

45. The computer program product of claim 39, wherein the measure of direction quality for a direction is based upon a number of landmarks included in the directions.

46. The computer program product of claim 39, wherein retrieving, from a plurality of websites, webpages comprising directions comprises:
   identifying a website that contains directions, based on at least one keyword contained in the website.

47. The computer program product of claim 39, wherein automatically parsing each webpage and extracting a set of directions therefrom comprises:
   retaining from a webpage the directions, direction-related context associated with the directions, and metadata associated with the directions; and
   discarding text, graphics, images, or formatting not related to the directions.

48. A computer system for generating and storing directions, the system comprising:
   a directions database, configured to store directions;
   a directions input module, configured to retrieve webpages from a plurality of websites;
   a direction extraction module, configured to automatically parse text of the retrieved webpages and extract therefrom directions; and
   an evaluator module, configured to score the directions based on a measure of quality, and to selectively retain directions based on their scores, and to store the retained directions in the directions database.

49. The computer system of claim 48, wherein the directions are human-provided driving directions.

50. The computer system of claim 48, wherein the evaluator module is further configured:
   responsive to at least one set of directions not being associated with a destination, to infer a destination for the set of directions from a context of the webpage from which the set of directions were extracted.

51. The computer system of claim 48, wherein the measure of quality for a direction is based upon source website of the webpage from which the direction was extracted.

52. The computer system of claim 48, wherein the measure of quality for a direction is based upon a measure of an importance of the webpage from which the direction was extracted.

53. The computer system of claim 48, wherein the measure of direction quality for a direction is based upon information indicating whether the directions are to a place of business, and extracted from a website provided by the business itself.

54. The computer system of claim 48, wherein the measure of quality for a direction is based upon a number of landmarks included in the directions.

55. The computer system of claim 48, wherein the directions input module is configured to identify a website that contains directions based on at least one keyword contained in the website.

56. The computer system of claim 48, wherein the extractor module is further configured to:
   retain from a webpage the directions, direction-related context associated with the directions, and metadata associated with the directions; and
   discard text, graphics, images, or formatting not related to the directions.

* * * * *